United States Patent
Mills

(10) Patent No.: US 11,513,799 B2
(45) Date of Patent: Nov. 29, 2022

(54) CHAINED BUFFERS IN NEURAL NETWORK PROCESSOR

(71) Applicant: Apple Inc., Cupertino, CA (US)

(72) Inventor: Christopher L. Mills, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 531 days.

(21) Appl. No.: 16/673,499

(22) Filed: Nov. 4, 2019

(65) Prior Publication Data

US 2021/0132945 A1 May 6, 2021

(51) Int. Cl.
*G06F 9/30* (2018.01)
*G06N 3/063* (2006.01)

(52) U.S. Cl.
CPC ............ *G06F 9/3004* (2013.01); *G06N 3/063* (2013.01)

(58) Field of Classification Search
None
See application file for complete search history.

(56) References Cited

U.S. PATENT DOCUMENTS

| | | | | |
|---|---|---|---|---|
| 5,148,527 A | * | 9/1992 | Basso | G06F 9/546 710/305 |
| 5,210,747 A | * | 5/1993 | Gauthier | H04L 9/40 370/463 |
| 5,214,783 A | * | 5/1993 | Lips | G06F 5/12 711/100 |
| 5,299,193 A | * | 3/1994 | Szczepanek | H01R 13/665 370/465 |
| 5,305,317 A | * | 4/1994 | Szczepanek | H04L 12/28 370/257 |
| 5,321,819 A | * | 6/1994 | Szczepanek | H04L 9/40 709/228 |
| 5,379,126 A | * | 1/1995 | Seto | H04N 1/40037 347/252 |
| 5,479,395 A | * | 12/1995 | Goodman | H04L 12/40143 370/461 |

(Continued)

FOREIGN PATENT DOCUMENTS

CN 1375773 A * 10/2002
CN 101855624 A * 10/2010 ........... G06F 1/3203

(Continued)

OTHER PUBLICATIONS

RD-444152-A, Apr. 2001, RD, Chen C.*

*Primary Examiner* — Berhanu Tadese
(74) *Attorney, Agent, or Firm* — Fenwick & West LLP

(57) ABSTRACT

Embodiments of the present disclosure relate to chained buffers in a neural processor circuit. The neural processor circuit includes multiple neural engines, a planar engine, a buffer memory, and a flow control circuit. At least one neural engine operates as a first producer of first data or a first consumer of second data. The planar engine operates as a second consumer receiving the first data from the first producer or a second producer sending the second data to the first consumer. Data flow between the at least one neural engine and the planar engine is controlled using at least a subset of buffers in the buffer memory operating as at least one chained buffer that chains flow of the first data and the second data between the at least one neural engine and the planar engine.

20 Claims, 8 Drawing Sheets

(56) References Cited

U.S. PATENT DOCUMENTS

| | | | | |
|---|---|---|---|---|
| 5,488,487 | A * | 1/1996 | Ojima | H04N 1/40037 358/1.9 |
| 5,561,807 | A * | 10/1996 | Verplanken | H04L 12/18 709/217 |
| 5,790,842 | A * | 8/1998 | Charles | H04N 21/64307 348/E9.037 |
| 5,793,427 | A * | 8/1998 | Mills | H04N 11/042 375/E7.206 |
| 5,815,043 | A * | 9/1998 | Chow | H03K 3/0315 331/108 C |
| 5,923,385 | A * | 7/1999 | Mills | H04N 9/641 348/718 |
| 5,926,647 | A * | 7/1999 | Adams | H04N 21/426 345/589 |
| 5,930,480 | A * | 7/1999 | Staats | H04L 12/40123 709/213 |
| 5,940,600 | A * | 8/1999 | Staats | H04L 12/40058 348/E5.006 |
| 5,953,691 | A * | 9/1999 | Mills | G09G 5/363 348/391.1 |
| 6,038,592 | A * | 3/2000 | Verplanken | H04L 12/18 709/215 |
| 6,088,355 | A * | 7/2000 | Mills | H04Q 11/0478 370/392 |
| 6,311,204 | B1 * | 10/2001 | Mills | H04N 21/64307 345/558 |
| 6,493,660 | B2 * | 12/2002 | Saito | G06F 30/3312 703/19 |
| 6,745,173 | B1 * | 6/2004 | Amundsen | G06F 16/24545 |
| 6,769,055 | B1 * | 7/2004 | Leung | H04L 49/90 711/171 |
| RE38,641 | E * | 10/2004 | Staats | H04L 12/40058 710/310 |
| 6,876,659 | B2 * | 4/2005 | Aznar | H04Q 11/0478 370/428 |
| 7,080,160 | B2 * | 7/2006 | Cognet | H04J 3/0644 709/248 |
| RE39,763 | E * | 8/2007 | Staats | H04N 21/443 710/310 |
| 7,460,666 | B2 * | 12/2008 | Morioka | H04L 9/0618 380/37 |
| 7,522,625 | B2 * | 4/2009 | Abe | H04L 49/9094 370/413 |
| 7,571,166 | B1 * | 8/2009 | Davies | G06Q 10/06 |
| 7,747,549 | B2 | 6/2010 | Hoya | |
| 8,032,552 | B2 * | 10/2011 | Davies | G06Q 10/06 707/716 |
| 8,368,707 | B2 * | 2/2013 | Lao | G09G 5/14 345/538 |
| 8,473,647 | B2 * | 6/2013 | Vidal | G06F 1/3203 710/60 |
| RE44,443 | E * | 8/2013 | Staats | H04N 21/443 710/308 |
| 8,661,021 | B2 * | 2/2014 | Davies | G06Q 10/087 707/716 |
| 9,157,790 | B2 * | 10/2015 | Shpunt | G01J 1/0411 |
| 9,196,066 | B2 * | 11/2015 | Moore | G06T 11/40 |
| 9,641,158 | B2 * | 5/2017 | Zemer | H03H 17/0664 |
| 9,651,417 | B2 * | 5/2017 | Shpunt | H01S 5/4012 |
| 9,787,416 | B2 * | 10/2017 | Shiva | H04L 47/283 |
| 10,038,425 | B1 * | 7/2018 | Zemer | H03H 17/0664 |
| 10,409,887 | B1 * | 9/2019 | Gauria | G06F 12/0646 |
| 11,095,252 | B1 * | 8/2021 | Zhao | H03D 7/1466 |
| 11,144,615 | B1 * | 10/2021 | Tse | G06F 7/544 |
| 11,196,435 | B1 * | 12/2021 | Xu | H03M 1/0629 |
| 11,200,490 | B2 * | 12/2021 | Park | G06N 3/08 |
| 2002/0051453 | A1 * | 5/2002 | Heo | H04Q 11/0478 370/399 |
| 2006/0029102 | A1 * | 2/2006 | Abe | H04L 47/34 370/474 |
| 2006/0229856 | A1 * | 10/2006 | Burrus | G16H 30/40 703/11 |
| 2014/0355381 | A1 * | 12/2014 | Lal | G06N 3/04 327/356 |
| 2018/0060034 | A1 | 3/2018 | Nicol et al. | |
| 2018/0101763 | A1 * | 4/2018 | Barnard | G06F 12/0607 |
| 2018/0164432 | A1 * | 6/2018 | Lal | G01S 7/521 |
| 2018/0189642 | A1 | 7/2018 | Boesch et al. | |
| 2018/0300628 | A1 * | 10/2018 | Young | G06N 3/0454 |
| 2019/0042923 | A1 * | 2/2019 | Janedula | G06N 3/0445 |
| 2019/0147327 | A1 * | 5/2019 | Martin | G06N 3/063 706/15 |
| 2019/0188141 | A1 * | 6/2019 | Ma | G06F 12/0875 |
| 2019/0205736 | A1 * | 7/2019 | Bleiweiss | G06N 3/0454 |
| 2019/0220742 | A1 * | 7/2019 | Kuo | G06F 12/084 |
| 2019/0251443 | A1 * | 8/2019 | Walters | G06N 3/08 |
| 2019/0340010 | A1 * | 11/2019 | Lee | G06N 3/04 |
| 2019/0340014 | A1 * | 11/2019 | Fishel | G06N 3/08 |
| 2019/0340490 | A1 * | 11/2019 | Fishel | G06F 9/50 |
| 2019/0340491 | A1 * | 11/2019 | Norden | G06N 3/04 |
| 2019/0340501 | A1 * | 11/2019 | Mills | G06N 3/063 |
| 2019/0392287 | A1 * | 12/2019 | Ovsiannikov | G06N 3/08 |
| 2020/0127836 | A1 * | 4/2020 | Pappachan | G06F 21/71 |
| 2020/0160226 | A1 * | 5/2020 | Ross | G06F 9/544 |
| 2020/0184320 | A1 * | 6/2020 | Croxford | G06N 3/0481 |
| 2020/0234099 | A1 * | 7/2020 | Wang | G06N 3/0454 |
| 2020/0294182 | A1 * | 9/2020 | George | G06N 3/063 |
| 2021/0103803 | A1 * | 4/2021 | Mills | G06F 17/15 |
| 2021/0125041 | A1 * | 4/2021 | Mills | G06N 3/063 |
| 2021/0132945 | A1 * | 5/2021 | Mills | G06N 3/084 |
| 2021/0133361 | A1 * | 5/2021 | Fishel | G06N 3/0454 |
| 2021/0158135 | A1 * | 5/2021 | Mills | G06N 3/084 |
| 2021/0241079 | A1 * | 8/2021 | Mills | G06N 20/10 |
| 2021/0271958 | A1 * | 9/2021 | Mills | G06N 5/046 |
| 2021/0279557 | A1 * | 9/2021 | Febbo | G06N 3/063 |
| 2021/0303359 | A1 * | 9/2021 | Park | G06F 9/5066 |
| 2021/0319290 | A1 * | 10/2021 | Mills | G06F 7/523 |
| 2022/0036158 | A1 * | 2/2022 | Kuo | G06N 3/08 |
| 2022/0036163 | A1 * | 2/2022 | Kuo | G06N 3/084 |
| 2022/0094304 | A1 * | 3/2022 | Zhao | H03B 5/1265 |
| 2022/0108155 | A1 * | 4/2022 | Abdulla | G06N 3/084 |
| 2022/0138553 | A1 * | 5/2022 | Mills | G06N 3/063 706/16 |
| 2022/0156575 | A1 * | 5/2022 | Mills | G06N 3/0454 |

FOREIGN PATENT DOCUMENTS

| | | | | |
|---|---|---|---|---|
| CN | 101855624 B | * | 6/2014 | G06F 1/3203 |
| CN | 112074846 A | * | 12/2020 | G06F 9/50 |
| CN | 112074847 A | * | 12/2020 | G06N 3/0454 |
| CN | 114204908 A | * | 3/2022 | H03B 5/1265 |
| DE | 102021210282 A1 | * | 3/2022 | H03B 5/1265 |
| EP | 3252951 A1 | * | 12/2017 | H03B 19/14 |
| EP | 3306478 A1 | * | 4/2018 | G06F 12/0207 |
| WO | WO-2009038641 A1 | * | 3/2009 | G06F 1/3203 |
| WO | WO 2018/194995 A1 | | 10/2018 | |
| WO | WO-2019212654 A1 | * | 11/2019 | G06N 3/0454 |
| WO | WO-2019212688 A1 | * | 11/2019 | G06F 9/50 |
| WO | WO-2021071670 A1 | * | 4/2021 | G06F 17/15 |
| WO | WO-2021080724 A1 | * | 4/2021 | G06F 17/15 |
| WO | WO-2021091626 A1 | * | 5/2021 | G06F 21/57 |
| WO | WO-2021178018 A1 | * | 9/2021 | G06F 9/3838 |

* cited by examiner

CHAINED BUFFERS IN NEURAL NETWORK PROCESSOR

BACKGROUND

1. Field of the Disclosure

The present disclosure relates to a circuit for performing operations related to neural networks, and more specifically to chained buffers in a neural network processor.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to chained buffers in a neural processor circuit. The neural processor circuit includes multiple neural engine circuits, a planar engine circuit, a buffer memory, and a flow control circuit. The neural engine circuit operates as a first producer of first data or a first consumer of second data by performing at least convolution operations on a channel of data. The planar engine circuit operates as a second consumer receiving the first data from the first producer by performing at least operations on one or more channels of data. Alternatively, the planar engine operates as a second producer sending the second data to the first consumer by performing at least operations on one or more channels of data. The buffer memory is coupled to the at least one neural engine circuit and the planar engine circuit and includes multiple buffers. At least a subset of the buffers operating as a chained buffer controls data flow between the neural engine circuit and the planar engine circuit.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to chained buffers in a neural processor circuit that includes multiple neural engine circuits and a planar engine circuit. A buffer memory is coupled to the neural engine circuit and the planar engine circuit to buffer flow of data between the neural engine circuits and the planar engine circuit. The buffer memory includes buffers that are sized to store a portion of data produced by one of the neural engine circuit and the planar engine circuit for consumption by the other of the neural engine circuit and the planar engine circuit.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input.

The electronic device may also include one or more other physical user-interface devices, such as a physical keyboard, a mouse and/or a joystick.

Figure 1:
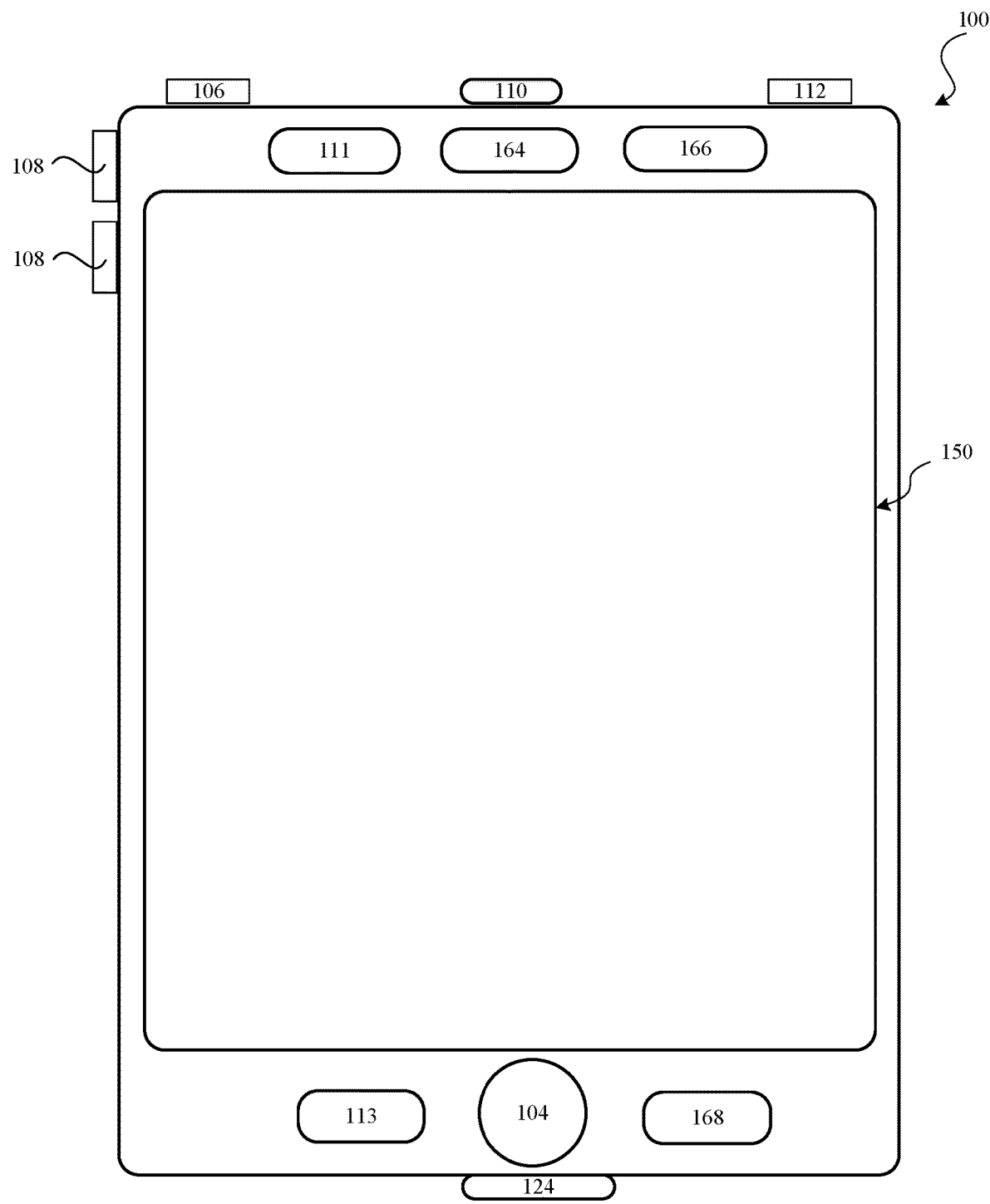
FIG. 1 is a high-level diagram of an electronic device, according to one embodiment.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
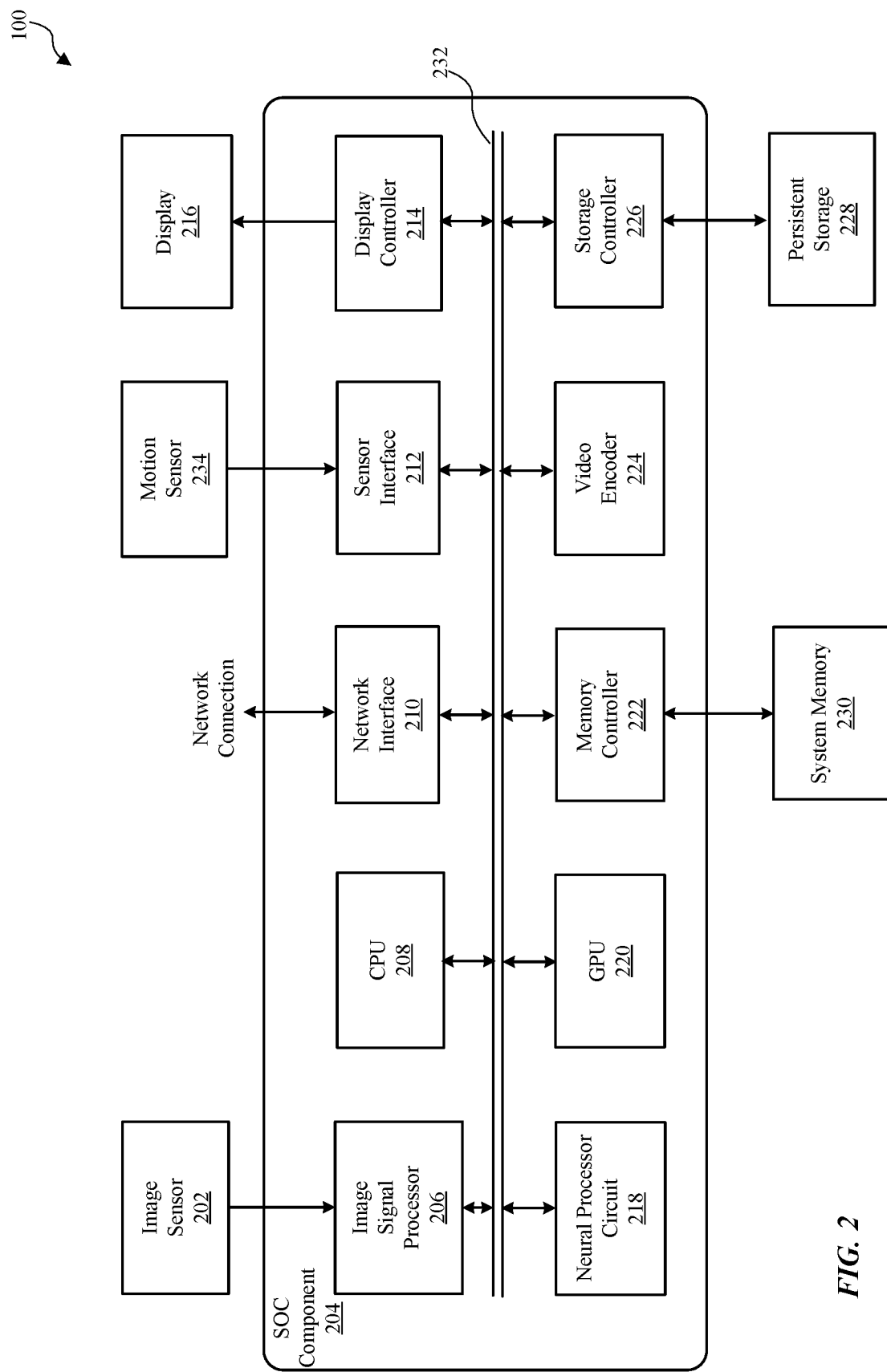
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
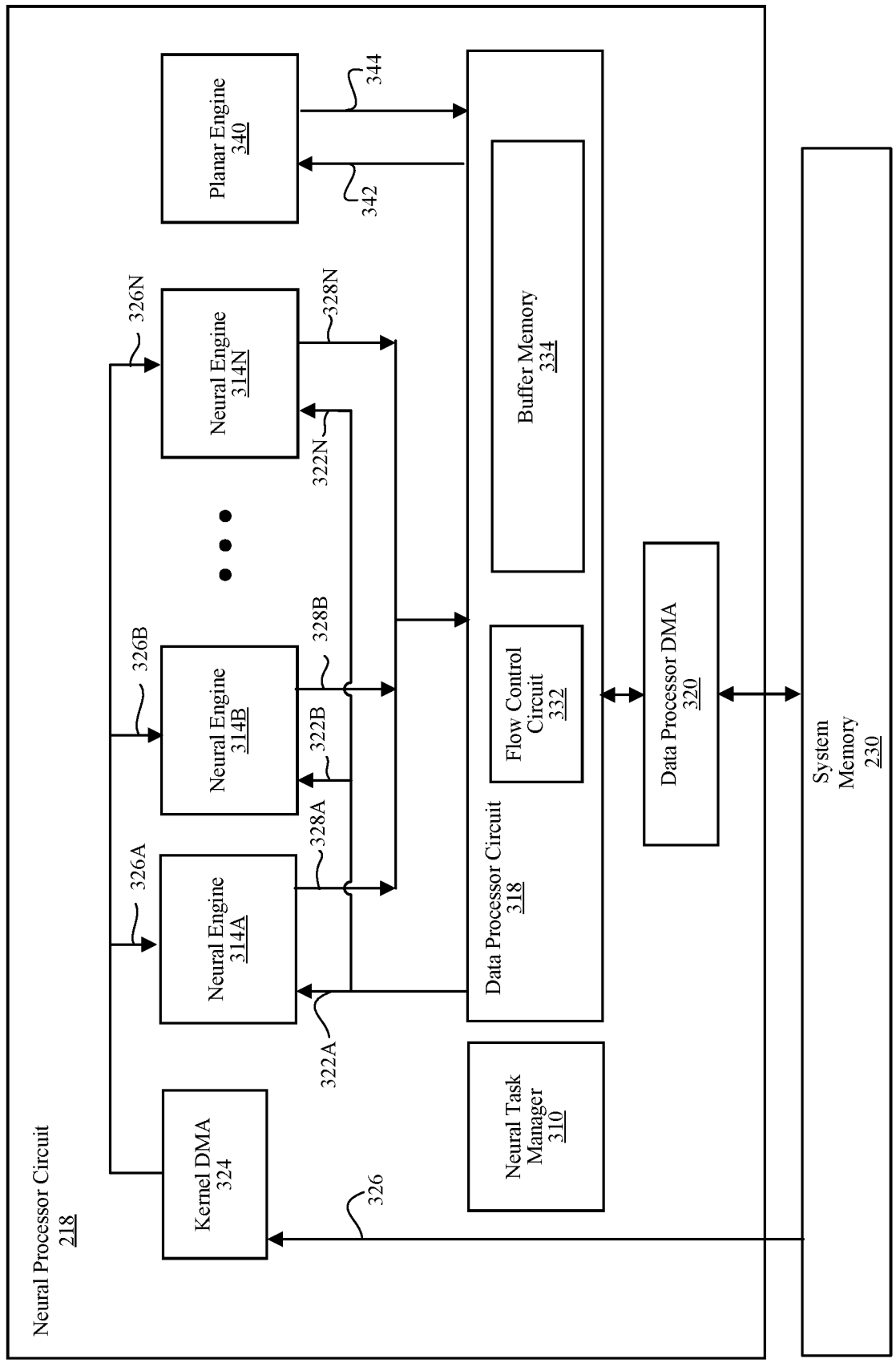
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer memory 334. Buffer memory 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer memory 334 is embodied as a non-transitory memory that can be accessed by neural engines 314 and planar engine 340. Buffer memory 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer memory 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer memory 334. For example, in various operating cycles, the source datasets from which one of the engines fetches as inputs may be different. The input of an engine may be an output of the same engine in previous cycles, outputs of different engines, or any other suitable source datasets stored in buffer memory 334. Also, a dataset in buffer memory 334 may be divided and sent to different engines for different operations in the next operating cycle. Two datasets in buffer memory 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer memory 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer memory 334, and a write circuit that forwards data from buffer memory 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer memory 334 may be a direct memory access buffer that stores data of a machine learning model of device 100 without involvement of CPU 208.

Example Neural Engine Architecture

Figure 4:
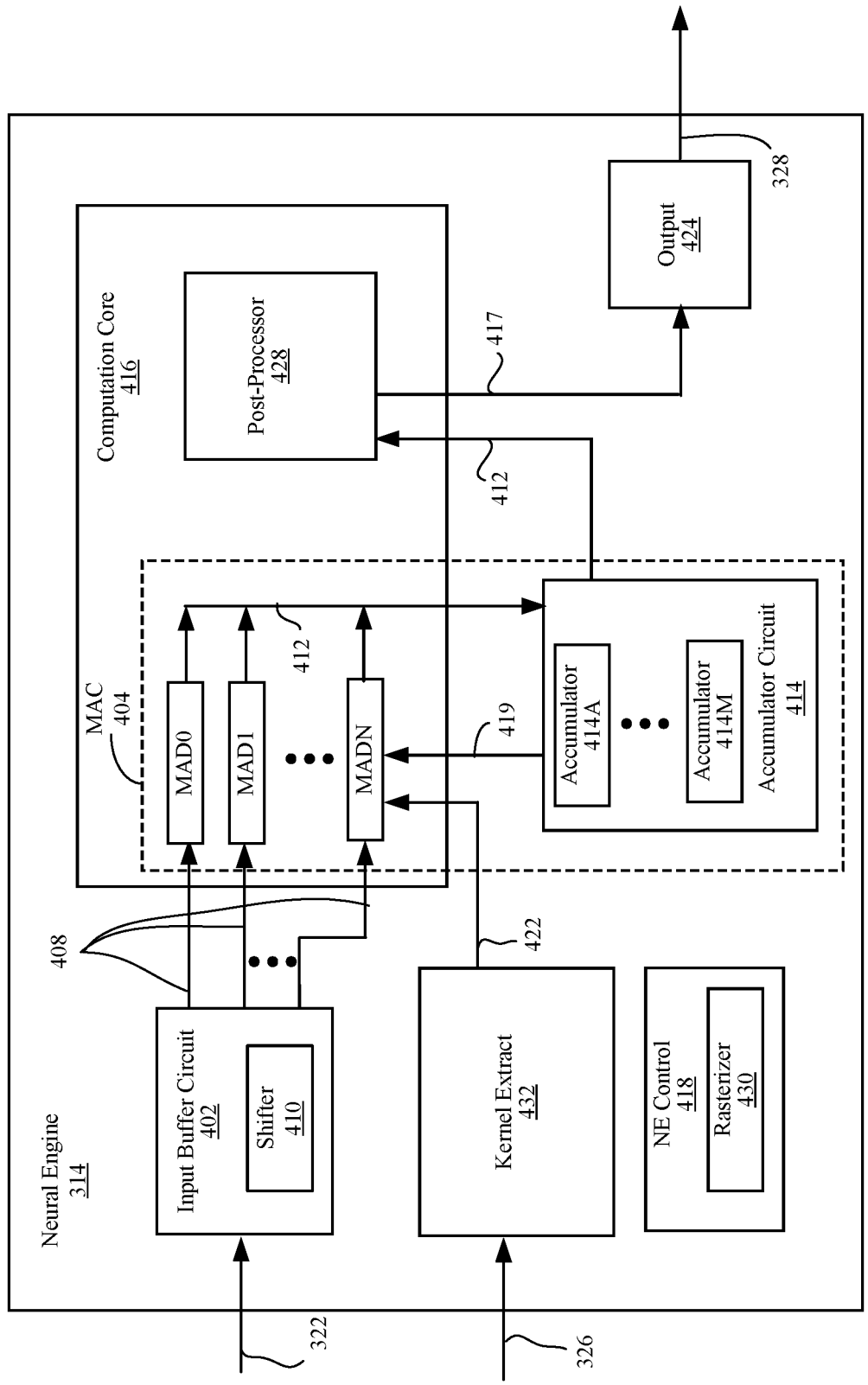
FIG. 4 is a block diagram of a neural engine in the neural processor circuit, according to one embodiment.

FIG. 4 is a block diagram of neural engine 314, according to one embodiment. Neural engine 314 performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator circuit 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator circuit 414 is a memory circuit that includes accumulators 414A through 414M that receive and store processed values 412 from MAD circuits. The processed values stored in accumulator circuit 414 may be sent back as feedback information 419 for further multiply and add operations at MAD circuits or sent to post-processor 428 for post processing. Accumulator circuit 414 in combination with MAD circuits form a multiply-accumulator (MAC) 404. In one or more embodiments, accumulator circuit 414 may have subunits (or batches) where each subunit sends data to different components of neural engine 314. For example, during a processing cycle, data stored in a first subunit of accumulator circuit 414 is sent to the MAC circuit while data stored in a second subunit of accumulator circuit 414 is sent to post-processor 428.

Post-processor 428 is a circuit that performs further processing of values 412 received from accumulator circuit 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator circuit 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator circuit 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator circuit 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator circuit 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer memory 334. Other components of neural processor circuit 218 (e.g., kernel DMA 324, buffer DMA 320, buffer memory 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine

Figure 5:
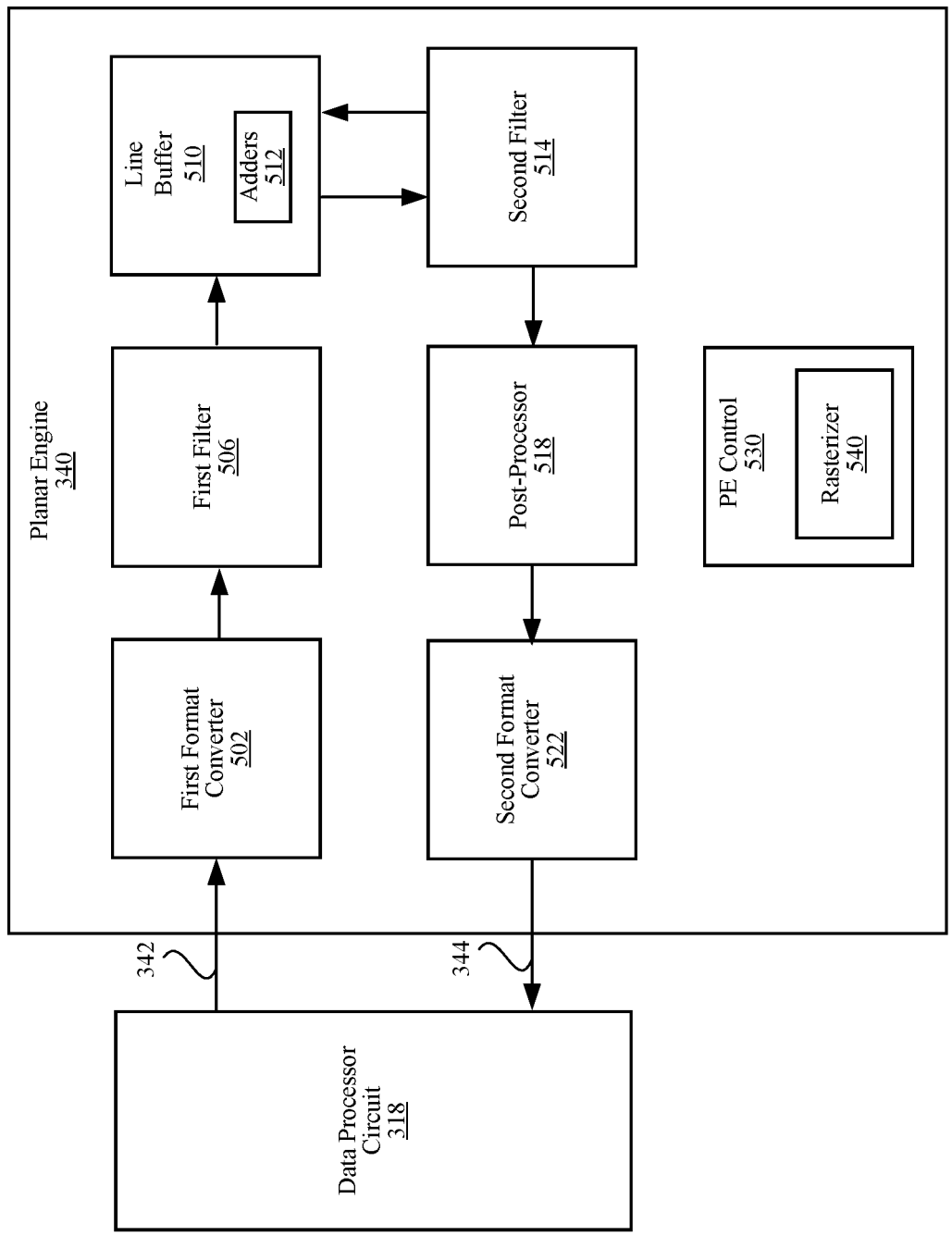
FIG. 5 is a block diagram of a planar engine in the neural processor circuit, according to one embodiment.

FIG. 5 is a block diagram of planar engine 340, according to one embodiment. Planar engine 340 is a circuit that is separated from the plurality of neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Example Chained Buffers in Neural Processor Circuit

Figure 6A:
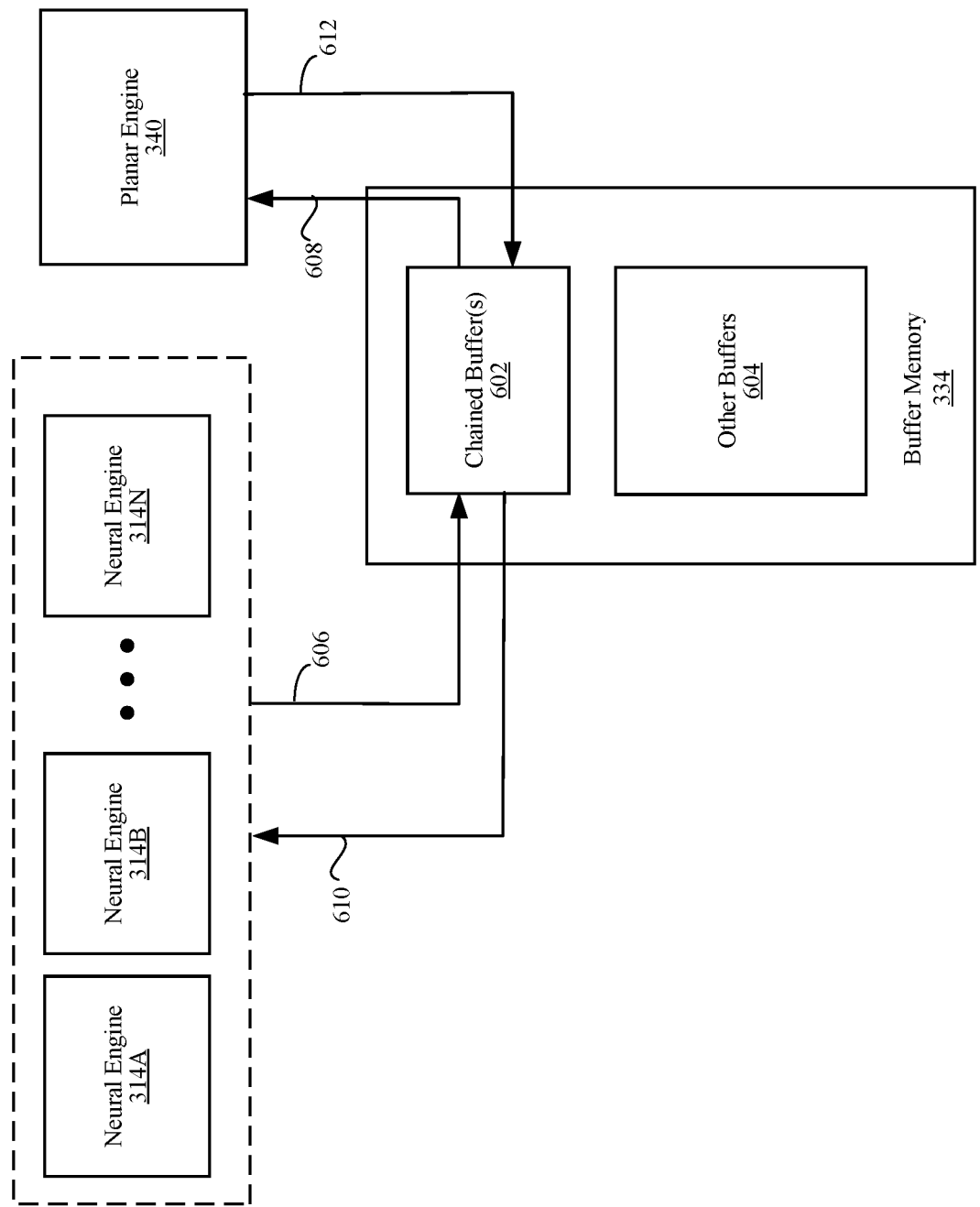
FIG. 6A is a block diagram of a buffer memory in the neural processor circuit including at least one chained buffer for controlling data flow between at least one neural engine and a planar engine, according to one embodiment.

FIG. 6A is a block diagram of buffer memory 334 that includes at least one chained buffer 602 for controlling data flow between neural engines 314A, 314B through 314N and planar engine 340, according to one embodiment. Neural engine 314A, 314B through 314N operates as a first producer of first data 606 or a first consumer of second data 610 by performing at least convolution operations on a channel of data (e.g., input data 322). Planar engine 340 operates as a second consumer receiving first data 608 from the first producer or as a second producer sending second data 612 to the first consumer by performing at least operations on one or more channels of data. For any given instance of chained buffer 602, there is a single producer and a single consumer. Thus, for any instance of chained buffer 602, either the flow of first data 606, 608 is active or the flow of second data 612, 610 is active.

Buffer memory 334 is coupled to neural engines 314A, 314B through 314N and planar engine 340. Buffer memory 334 includes multiple buffers, e.g., buffers 602, 604 for storage of data used by neural engines 314A, 314B through 314N and planar engine 340. At least one buffer 602 of buffer memory 334 can be configured to operate as a chained buffer. Each chained buffer 602 of buffer memory 334 controls data flow between a single producer and a single consumer. Chained buffer 602 allows an output of one execution circuit (e.g., a circuit of neural engine 314, which may operate as a producer) to be directly chained to an input of another execution circuit (e.g., a circuit of planar engine 340, which may operate as a consumer). Other buffers 604 can be also set to operate as one or more chained buffers to chain data flow between neural engines 314A, 314B through 314N and planar engine 340. Chained buffer 602 is an ephemeral buffer, which means that after the last of data from the producer has been read by the consumer, a buffer space associated with chained buffer 602 is released and can be used by one or more subsequent tasks for other purposes, e.g., either as another ephemeral buffer or to create a new persistent buffer that would be retained for the one or more subsequent tasks. Chained buffer 602 is configured as a source chained consumer's buffer and as a destination chained producer's buffer.

At least a subset of other buffers 604 can be set to operate as, e.g., a non-resident buffer, a resident buffer and/or a cached buffer. The non-resident buffer is an ephemeral buffer that may be attached to, e.g., data processor DMA 320. The non-resident buffer may be sized to hold an input or output tile (e.g., for neural engine 314) or an input or output patch for planar engine 340. The non-resident buffer of a source type may be between a read port of data processor DMA 320 and neural engine 314 (or planar engine 340). The non-resident buffer of a destination type may be between neural engine 314 (or planar engine 340) and a write port of data processor DMA 320. The resident buffer is a full-sized surface retained in buffer memory 334, which means that the resident buffer is a persistent buffer. The resident buffer may be set as a resident destination that may create, e.g., a tensor from output data 328 of neural engine 314 or from output data 344 of planar engine 340. The resident destination buffer may be then used as an input (e.g., a resident source) for neural engine 314 or planar engine 340. The cached buffer is a persistent buffer. The cached buffer may have the same layout as the resident buffer, but the cached buffer may be also chained to, e.g., data processor DMA 320. The cached buffer may be utilized when a source resident in data processor DMA 320 is retained in buffer memory 334 for use by subsequent operations, or if a destination needs to be retained in buffer memory 334 for use as a subsequent source while also producing a copy in system memory 230. A chained destination cached buffer creates, e.g., a tensor from output data 228 of neural engine 314 (or from output data 344 of planar engine 340), and writes the tensor to data processor DMA 320. The chained destination cached buffer may write a second copy of the tensor in, e.g., system memory 230. A chained source cached buffer may read, e.g., a tensor of data from data processor DMA 320 into an execution circuit of neural engine 314 (e.g., as input data 322) or into planar engine 340 (e.g., as input data 344). The chained source cached buffer may retain a (resident) copy of the tensor of data.

All four buffer types in buffer memory 334 (e.g., chained, non-resident, resident and cached buffers) can be utilized for control of data flow. The ephemeral buffers control data flow between producers and consumers. Cached buffers control data flow with data processor DMA 320, e.g., similar to non-resident buffers. Resident buffers may optionally be marked as dependent, in which case the resident buffers control data flow in a manner similar to chained buffers. The differences are that a dependent resident buffer represents a full tensor allocation, and that the producer and consumer do not need to execute at the same time (as opposed to chained buffer 602 that acts as a FIFO between a pair of execution units). The primary distinction between ephemeral buffers and persistent buffers is the allocation. A persistent buffer represents a full tensor buffer. A producer (e.g., neural engine 314) and consumer (e.g., planar engine 340) interfaced via the persistent buffer do not need to run simultaneously, and a resident copy may be retained for an arbitrary amount of time and re-used as necessary for one or more subsequent tasks. An ephemeral buffer (e.g., chained buffer 602) is a buffer that stores a windowed subset of a tensor. Chained buffer 602 thus acts as a FIFO between a producer (e.g., neural engine 314) and a consumer (e.g., planar engine 340), and holds a portion of the tensor. The producer and consumer necessarily are executing at the same time, and either producer or consumer can stall the other by producing or consuming data below, e.g., a threshold rate.

Resident buffers in buffer memory 334 may be rewritten to cached buffers automatically by, e.g., a context-switch mechanism. The context-switch is a mechanism by which a type of a buffer is switched from one type to another different type, e.g., from a resident buffer to a cached buffer. The context switch mechanism may rewrite resident buffers in buffer memory 334 to become cached buffers. On a context switch-out during a task, a resident destination may be rewritten to become a cached destination, causing an output of neural engine 314 (or planar engine 340) to be copied into, e.g., system memory 230. On a subsequent context switch-in of the task, the first use of a resident source buffer is re-written to become a cached source, causing the external copy to be read in from system memory 230 (and the resident buffer may be restored for one or more subsequent tasks, if any).

Buffer memory 334 can include at most one chained buffer 602 corresponding to a data chain between a pair of execution circuits (e.g., a producer-consumer pair). In addition to chained buffer 602, buffer memory 334 may include (e.g., within other buffers 604) up to two non-resident buffers for the read and write DMA used as corresponding inputs to a producer (e.g., an execution circuit of neural engine 314) and outputs from a consumer (e.g., an execution circuit of planar engine 340). These non-resident buffers are also ephemeral, and can be released on the last usage. Other buffers 604 in buffer memory 334 may include any number of persistent (e.g., resident) buffers, which are managed by a software and retain previously computed or read tensors (e.g., from data processor DMA 320) for re-use in one or more subsequent tasks (e.g., by neural engine 314 or planar engine 340).

Usage of different buffers in buffer memory 334 may be configured by source and result parameters of each task. A task has an operation type (e.g., "neural engine convolution operation", "planar engine element-wise operation", etc.), a result descriptor, and at least one source descriptor (e.g., element-wise operations may require a second source). The source and result descriptors may contain: a buffer type, a buffer base address (e.g., provided by the software), an indication about buffer strides, and dependency information. The indication about buffer strides may be provided by, e.g., the software so that neural engine 314 (or planar engine 340) can utilize appropriate elements in a tensor (e.g., in input data 322 or in input data 342). Flow control circuit 332 may utilize the dependency information to determine which other tasks a particular buffer in buffer memory 334 (e.g., chained buffer 602) may be dependent on, if any. A buffer in buffer memory 334 (e.g., chained buffer 602) may have a true dependency (e.g., as in the case of the dependent resident buffer) or be an alias (e.g., a reallocation of the buffer for a different purpose). Aliases may be tagged to ensure that a new unrelated use (e.g., task) of a previously allocated region does not start before the previous use finishes.

As discussed, data flow between neural engines 314A, 314B through 314N and planar engine 340 may be controlled using at least a subset of buffers in buffer memory 334 configured as chained buffer 602. Buffer 602 may be configured (e.g., by a software) to operate as a chained buffer that chains flow of first data 606, 608 and second data 610, 612 between neural engines 314A, 314B through 314N and planar engine 340. Chained buffer 602 is sized such that sizes of tiles and patches of first data 606 or second data 612 from a corresponding producer of the first and second producers match sizes of tiles and patches of first data 608 or second data 610 for a corresponding consumer of the first and second consumers.

Chained buffer 602 may be configured to simultaneously store at most a defined amount of first data 606 or second data 612. After storing a threshold amount of first data 606 in chained buffer 602, chained buffer 602 may provide at least the threshold amount of first data 606 as first data 608 to planar engine 340 that operates as the second consumer. Similarly, after storing a threshold amount of second data 612 in chained buffer 602, chained buffer 602 may provide the threshold amount of second data 612 as second data 610 to neural engines 314A, 314B through 314N.

Chaining is represented by two paired tasks, e.g., by a producing task and a consuming task. The producing task includes a set of operations performed by the first producer or the second producer. Similarly, the consuming task includes a set of operations performed by the first consumer or the second consumer. To set up a chain, the producing task needs to start with a result descriptor of the producing task written as chained. The software may set the result descriptor of the producing task as chained. One or more source descriptors of the producing task can be set (e.g., by the software) to any of other non-chained buffer types. After the result descriptor of the producing task is set as chained, buffer 602 is configured as a chained buffer to control data flow produced by the first producer or the second producer, and chained buffer 602 stores first data 606 or second data 612 produced by the producing task. As the result descriptor of the producing task is set as chained, the producer task may start executing, e.g., read data from at least one source, perform computations and then start writing into chained buffer 602. The neural task manager 310 may stall the producing task at the first producer or the second producer after storing a defined amount of first data 606 or second data 612 in chained buffer 602, if the consuming task of the first consumer or the second consumer has not yet started consuming data produced by the producing task as chained buffer 602 reached its space limit. The producing task is addressed (e.g., by neural task manager 310) to an execution circuit of the first consumer (e.g., neural engine 314) or to an execution circuit of the second consumer (e.g., planar engine 340).

After the producing task has started, a second task (e.g., the consuming task) is introduced, with one of its source descriptors written as chained (e.g., by the software). The consuming task is addressed (e.g., by neural task manager 310) to an execution circuit of the first consumer (e.g., neural engine 314) or to an execution circuit of the second consumer (e.g., planar engine 340). The software may set a source descriptor for the consuming task as chained. After the source descriptor of the consuming task is set as chained, buffer 602 is configured as a chained buffer to control data flow from the first producer to the first consumer or from the second producer to the second consumer. For example, if the consuming task is an element-wise operation on planar engine 340, chained buffer 602 provides data for an execution circuit of planar engine 340 performing the element-wise operation. If the consuming task starts before the producing task has produced a threshold amount of data to chained buffer 602, neural task manager 310 may stall the consuming task. Alternatively, if the consuming task starts after the producing task has produced the threshold amount of data to chained buffer 602, the first consumer or the second consumer may immediately read and use data, and therefore freeing space for the producing task.

Data flow continues through chained buffer 602 with both producing and consuming tasks running. At some point in time, the first producer or the second producer finishes writing into chained buffer 602, and a corresponding execution circuit of the first producer or the second producer would be freed up to start a new producing task. The consuming side of the chain may still be operating on remaining data from the first producer or the second producer. Once the first consumer or the second consumer finishes using the remaining data, the chain would end. In one or more embodiments, the consuming task starts before the producing task. In such case, the first consumer or the second consumer immediately stalls (e.g., by neural task manager 310) until the producing task has started and produced a defined amount of data to chained buffer 602 produced by an execution circuit of the first producer or the second producer.

From a scheduling and flow-control perspective, neural task manager 310 issues tasks to their appropriate execution circuits of neural engine 314 or planar engine 340. Flow-control circuit 332 may overlook at a current task on a corresponding execution circuit of neural engine 314 (or planar engine 340). Flow-control circuit 332 may then decide on an interface-by-interface basis (e.g., neural engine write, neural engine read, planar engine write, planar engine source 1 read, planar engine source 2 read, DMA write, DMA read) whether a request for a corresponding data flow is allowed to proceed based on its buffer type and its relationship (if any) to some other interface. For example, a non-resident source read for planar engine 340 may have a consumer relationship with a read interface of data processor DMA 320 (which acts as a producer). At any point in time, there may be up to three different flow controls, e.g., one chained (or dependent) flow control and two non-resident (e.g., read and write) flow controls. In an embodiment, three simultaneously active flow controls can be e.g., flow control from a read interface of data processor DMA 320 to a read interface of planar engine 340 (non-resident read flow control), from a write interface of planar engine 340 to a read interface of neural engine 314 (chained flow control), and from a write interface of neural engine 314 to a write interface of data processor DMA 320 (non-resident write flow control).

The producing task and the consuming task issue (e.g., by neural task manager 310) to their individual execution circuits and start as soon as that execution circuit is free of other preceding tasks. The consuming task may be initiated (e.g., by neural task manager 310) responsive to a corresponding circuit (to which the consuming task has been issued) of the first consumer or the second consumer is not operating in relation to another task different than the consuming task. The producing task and the consuming task may start in either order. In one or more embodiments, the consuming task may perform certain operations even before the producer's task issues (e.g., a dual-source task of planar engine 340 may read some data from a non-chained second source before stalling on a chained buffer). Responsive to setting the source descriptor for the consuming task as chained, chained buffer 602 provides first data 608 or second data 610 to the corresponding circuit of the first consumer or the second consumer. Neural task manager 310 may stall the consuming task until the producing task writes a threshold amount of first data 606 or second data 612 into buffer 602.

As discussed, chained tasks (e.g., the paired producing task and consuming task) are executed simultaneously. The paired producing and consuming tasks cannot not be split by the context switch mechanism because chained buffer 602 controlling data flow of the producing and consuming tasks is not a context switchable buffer. Buffers 602 dedicated for chained pairs of producing and consuming tasks (e.g., chained buffers 602) are simultaneously resident in buffer memory 334, and there are no resource dependencies between any two paired producing and consuming tasks.

Buffer pointers to chained buffer 602 that chains data flow for a pair of producing-consuming tasks are set (e.g., by the software) to be the same. Additionally, data parameters (e.g., weight, height, depth, channel, groups, format, etc.) for the pair of producing-consuming tasks are also set to be the same for chained buffer 602. A single task cannot be associated with more than one chained buffer 602, which means that a chain provided via chained buffer 602 is associated with a single producer-consumer pair. Other buffers 604 in buffer memory 334 that are not chained may be configured as dependent resident buffers to allow, e.g., fully pipelined arbitrary length chains. From a flow-control perspective, dependent resident buffer 604 and chained buffer 602 operate in the same manner. The only difference between dependent resident buffer 604 and chained buffer 602 is their size. Chained buffer 602 does not contain a full tensor, and hence can back-pressure the first producer (e.g., neural engine 314) or the second producer (e.g., planar engine 340), while dependent resident buffer 604 is large enough to hold all of the produced data.

In one embodiment, both paired producing and consuming tasks are single-slice tasks, which means that the producing and consuming tasks operate on first data 606 and second data 612 that represent a single slice of data. If either producing or consuming task is sliced, e.g., either first data 606 or second data 612 include multiple slices of data, chained buffer 602 is configured to chain data flow such that both the producing and consuming tasks are sliced. Thus, first data 608 provided to the second consumer (e.g., planar engine 340) and second data 610 provided to the first consumer (e.g., neural engine 314) are also divided into slices.

In one embodiment, the consuming task does not have a vertical kernel support, which means that a kernel height, Kh, is equal to 1. In such case, input slices for the consuming task do not overlap. Hence, flow control circuit 332 can map output slices of first data 606 or second data 612 produced in the producing task and stored in chained buffer 602 into input slices of first data 608 or second data 610 for the consuming task. The producing task and the consuming task operate on a same slice at the same time (e.g., the first data 606, 608 belong to the same slice, and the second data 612, 610 belong to the same slice), with a windowed portion of a tensor sliding along the slice. At the end of the slice, the first producer (e.g., neural engine 314) or the second producer (e.g., planar engine 340) is configured to wait for the first consumer (e.g., planar engine 340) or the second consumer (e.g., neural engine 314) to finish consuming the slice before the first producer or the second producer can start writing data for a next slice (e.g., data 606 or data 612) into chained buffer 602. Flow control circuit 332 prevents this data hazard by stalling the first producer (e.g., neural engine 314) or the second producer (e.g., planar engine 340) until the first consumer or the second consumer finishes consuming the data slice (e.g., slice of data 608 or slice of data 610).

In case of a convolution performed by neural engine 314 on source tensors (e.g., input data 322) that are too large for storage in buffer memory 334, the convolution can be split into two or more sub-convolutions applied on two or more vertical slices of the source tensors (e.g., sub-tensors of input data 322). The sub-convolutions can be treated as individual convolutions of the sliced portions of their sub-tensors. Neural engine 314 performs the sub-convolutions on an input tensor (e.g., input data 322) split into two or more vertical input slices using kernel data 326 to produce an output tensor (e.g., output data 328) split into two or more output slices produced by the sub-convolutions that fit into buffer memory 334.

In the case of convolution or pooling with Kh>1, the consumer's input slices (e.g., slices of input data 322) overlap. If chained buffer 602 chains data flow between a producer (e.g., planar engine 340) and a consumer (e.g., neural engine 314) with Kh>1, then the producer's input slices (e.g., slices of input data 342) overlap well as the consumer's input slices (e.g., slices of input data 322). Since the consumer's input slices represent the producer's output slices, the overlapping of the consumer's input slices is related to overwork in addition to over-fetching. To address this, an overlapping portion of chained buffer 602 between each consumer's input slice stored in chained buffer 602 is re-computed. In the case of chaining between the producer (e.g., planar engine 340) and the consumer (e.g., neural engine 314), both the producer and the consumer run its own rasterizer, e.g., rasterizer 540 and rasterizer 430. The consumer's rasterizer (e.g., rasterizer 430) may operate in the same manner as if there is no chaining. The producer's rasterizer (e.g., rasterizer 540) is configured to back up each consumer's input slice (which is a producer's output slice, e.g., slice of input data 322) by an amount of overwork, e.g., the re-computed overlapping portion of the input slice determined by an overlap parameter. The software may compute a value of the overlap parameter using parameters of a consumer's convolution, e.g., the overlap parameter may be computed as a function of parameters Kh and Sy (stride factor in vertical direction). In some embodiments, the value of overlap parameter is directly proportional to Kh and Sy, and the value of overlap parameter increases with increasing Kh and decreases with increasing Sy.

Figure 6B:
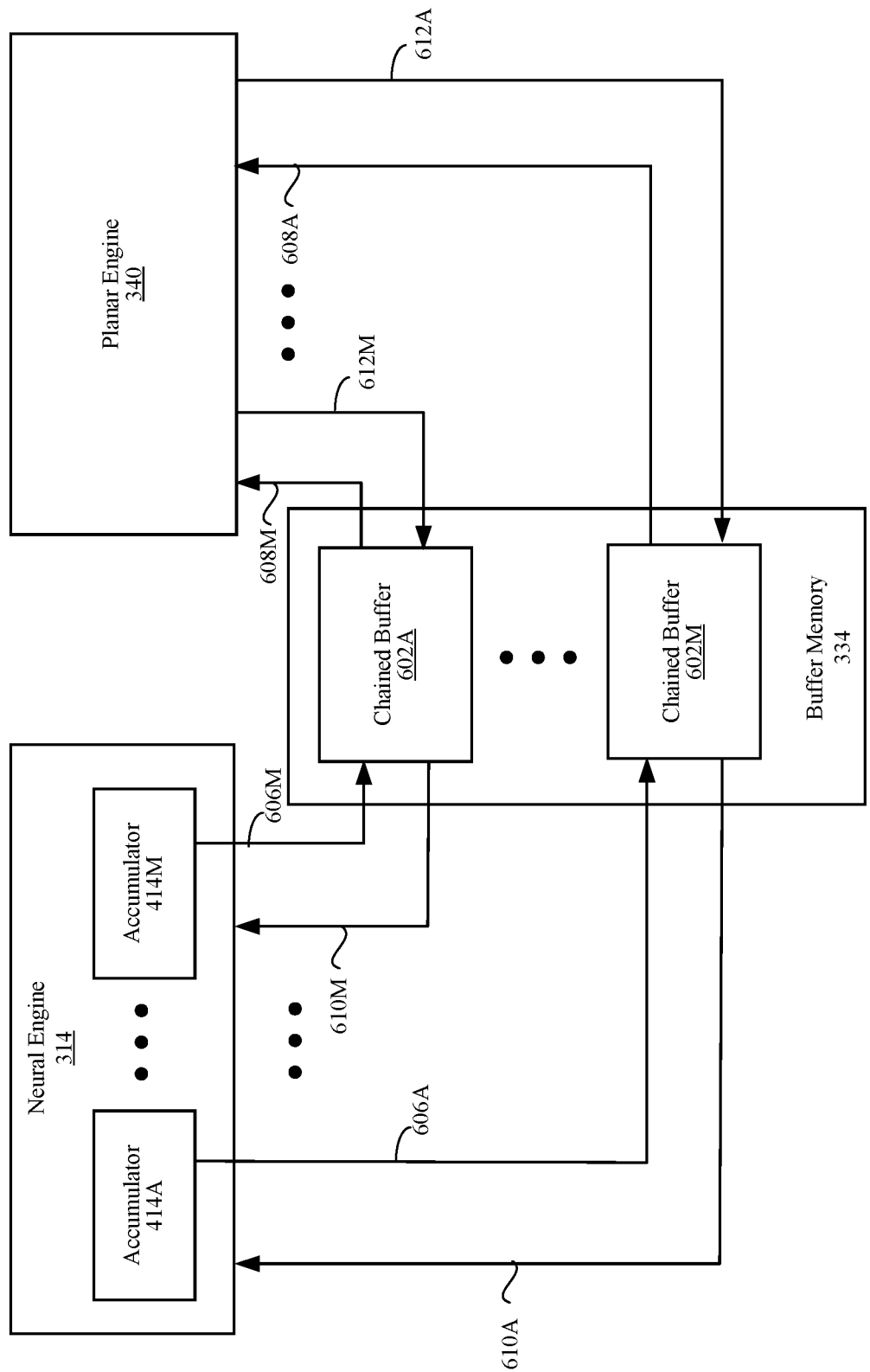
FIG. 6B is a block diagram of chained buffers in the neural processor circuit for controlling data flow between accumulators of the at least one neural engine and the planar engine, according to one embodiment.

FIG. 6B is a block diagram of chained buffers 602A through 602M in buffer memory 334 interfacing neural engine 314 and planar engine 340, according to one embodiment. Neural engine 314 includes multiple accumulators 414A through 414M that store processed values 412 related to, e.g., a convolution operation on a channel of input data 408. Each accumulator 414A through 414M may be configured to operate as a first producer of data, e.g., corresponding data 606A through 606M. Further, one or more circuits of neural engine 314 (e.g., input buffer circuit 402) may be configured to operate as a first consumer of data (e.g., data 610A through 610M).

Planar engine 340 performs operations on one or more channels of data. In one embodiment, planar engine 340 is configured to operate as a second consumer receiving first data 608A through 608M from accumulators 414A through 414M. In another embodiment, planar engine 340 is configured to operate as a second producer sending second data 612A trough 612M to one or more circuits of neural engine 314, e.g., to input buffer circuit 402.

Buffer memory 334 interfaces accumulators 414A through 414M of neural engine 314 and planar engine 340. Buffer memory 334 includes multiple chained buffers 602A through 602M. Each chained buffer 602A through 602M is set to chain flow of data between a corresponding accumulator 414A through 414M in neural engine 314 and planar engine 340.

In one embodiment, each chained buffer 602A through 602M receives and stores corresponding first data 606A through 606M from a corresponding accumulator 414A through 414M operating as a first producer. Each chained buffer 602A through 602M chains flow of received and stored first data 606A through 606M to planar engine 340 as corresponding first data 608A through 608M. Planar engine 340 operates as a second consumer that uses first data 608A through 608M performing operations on one or more channels of corresponding first data 608A through 608M.

In another embodiment, planar engine 340 operates as a second producer of data, e.g., second data 612A through 612M produced by performing at least operations on one or more channels of data. Each chained buffer 602A through 602M receives and stores corresponding second data 612A through 612M from planar engine 340. Each chained buffer 602A through 602M chains flow of received and stored second data 612A through 612M to one or more circuits of neural engine 314 (e.g., input buffer circuit 402) as corresponding second data 610A through 610M. For any given instance of chained buffer 602A through 602M, there is a single producer and a single consumer. Thus, for any instance of chained buffer 602A through 602M, either the corresponding flow of first data 606A through 606M, 608A through 608M is active, or the corresponding flow of second data 612A through 612M, 610A through 610M is active.

Example Process at Neural Engine Architecture

Figure 7:
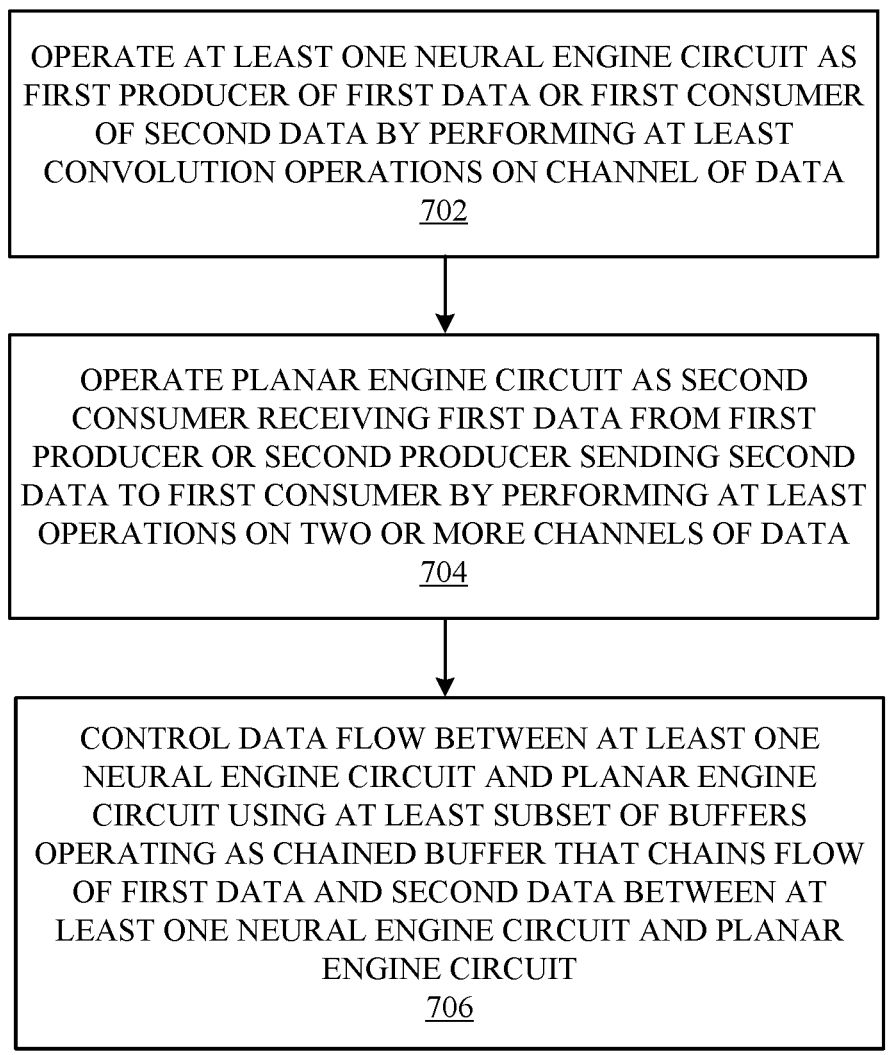
FIG. 7 is a flowchart illustrating a method of performing control of data flow in the neural processor circuit using chained buffers, according to one embodiment.

FIG. 7 is a flowchart illustrating a method of controlling data flow in a neural processor circuit using chained buffers, according to one embodiment. The neural processor circuit operates 702 a neural engine circuit (e.g., neural engine 314) as a first producer of first data or a first consumer of second data by performing at least convolution operations on a channel of data.

The neural processor circuit operates 704 a planar engine circuit (e.g., planar engine 340) as a second consumer receiving the first data from the first producer or a second producer sending the second data to the first consumer by performing at least operations on one or more channels of data. The neural processor circuit controls 706 data flow between the neural engine circuit and the planar engine circuit using at least a subset of buffers (e.g., buffers 602, 604) operating as a chained buffer (e.g., one or more chained buffers 602) that chains flow of the first data and the second data between the neural engine circuit and the planar engine circuit. The buffers are included in a buffer memory (e.g., buffer memory 334) coupled to the neural engine circuit and the planar engine circuit.

Embodiments of the process as described above with reference to FIG. 7 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
   a plurality of neural engine circuits, at least one of the neural engine circuits configured to produce first data or consume second data by performing at least convolution operations on a channel of data;
   a planar engine circuit configured to consume the first data received from the at least one neural engine circuit or produce the second data for the at least one neural engine circuit by performing at least operations on one or more channels of data; and
   a buffer memory coupled to the at least one neural engine circuit and the planar engine circuit, the buffer memory including a plurality of buffers, at least one of the buffers configured to control data flow between the at least one neural engine circuit and the planar engine circuit by operating as a chained buffer, wherein the chained buffer:
   controls flow of the first data from the at least one neural engine circuit to the planar engine circuit, and controls flow of the second data from the planar engine circuit to the at least one neural engine circuit.

2. The neural processor circuit of claim 1, wherein, responsive to a result descriptor for a producing task of the at least one neural engine circuit or the planar engine circuit being set as chained, the chained buffer is configured to:
control data flow produced by the at least one neural engine circuit or the planar engine circuit; and
store the first data or the second data produced by the producing task.

3. The neural processor circuit of claim 2, wherein the neural processor circuit further comprises:
a neural task manager configured to stall the producing task at the at least one neural engine circuit or the planar engine circuit responsive to storing a defined amount of the first data or the second data in the chained buffer and before starting of a consuming task of the at least one neural engine circuit or the planar engine circuit.

4. The neural processor circuit of claim 1, wherein, responsive to a source descriptor for a consuming task of the at least one neural engine circuit or the planar engine circuit being set as chained, the chained buffer is configured to:
control data flow to the at least one neural engine circuit or the planar engine circuit; and
provide the first data or the second data to a corresponding circuit of the at least one neural engine circuit or the planar engine circuit.

5. The neural processor circuit of claim 4, wherein the neural processor circuit further comprises:
a neural task manager configured to start the consuming task after starting the producing task, responsive to the corresponding circuit of the at least one neural engine circuit or the planar engine circuit not operating in relation to another task different than the consuming task.

6. The neural processor circuit of claim 4, wherein the neural processor circuit further comprises:
a neural task manager configured to stall the consuming task until the producing task writes a threshold amount of the first data or the second data into the chained buffer.

7. The neural processor circuit of claim 4, wherein the neural processor circuit is further configured to:
map output slices of the first data or the second data produced in the producing task and stored in the chained buffer into input slices of data for the consuming task.

8. The neural processor circuit of claim 1, wherein the chained buffer is sized such that sizes of tiles and patches of the first data or the second data produced by the at least one neural engine circuit or the planar engine circuit match sizes of tiles and patches of the first data or the second data for consumption by the at least one neural engine circuit or the planar engine circuit.

9. The neural processor circuit of claim 1, wherein the chained buffer is configured to simultaneously store at most a defined amount of the first data or the second data.

10. The neural processor circuit of claim 1, wherein, responsive to storing a threshold amount of the first data or the second data in the chained buffer, the chained buffer is configured to provide at least the threshold amount of the first data to the planar engine circuit or provide at least the threshold amount of the second data to the at least one neural engine circuit.

11. A method of operating a neural processor circuit, comprising:
operating at least one neural engine circuit of a plurality of neural engine circuits to produce first data or consume second data by performing at least convolution operations on a channel of data;
operating a planar engine circuit to consume the first data received from the at least one neural engine circuit or produce the second data for the at least one neural engine circuit by performing at least operations on one or more channels of data; and
controlling data flow between the at least one neural engine circuit and the planar engine circuit using at least one of a plurality of buffers in a buffer memory operating as a chained buffer, wherein the chained buffer:
controls flow of the first data from the at least one neural engine circuit to the planar engine circuit, and
controls flow of the second data from the planar engine circuit to the at least one neural engine circuit.

12. The method of claim 11, further comprising:
setting a result descriptor for a producing task of the at least one neural engine circuit or the planar engine circuit as chained; and
responsive to setting the result descriptor as chained, storing the first data or the second data produced by the producing task into the chained buffer.

13. The method of claim 12, further comprising:
stalling the producing task at the at least one neural engine circuit or the planar engine circuit, responsive to storing a defined amount of the first data or the second data in the chained buffer and before starting of a consuming task of the at least one neural engine circuit or the planar engine circuit.

14. The method of claim 11, further comprising:
setting a source descriptor for a consuming task of the at least one neural engine circuit or the planar engine circuit as chained; and
responsive to setting the source descriptor as chained, providing the first data or the second data via the chained buffer to the corresponding circuit of the at least one neural engine circuit or the planar engine circuit.

15. The method of claim 14, further comprising:
starting the consuming task after starting the producing task, responsive to a corresponding circuit of the at least one neural engine circuit or the planar engine circuit is not operating in relation to another task different than the consuming task.

16. The method of claim 14, further comprising:
stalling the consuming task until the producing task writes a threshold amount of the first data or the second data into the chained buffer.

17. The method of claim 14, further comprising:
mapping output slices of the first data or the second data produced in the producing task and stored in the chained buffer into input slices of data for the consuming task.

18. The method of claim 11, further comprising:
storing in the chained buffer simultaneously at most a defined amount of the first data or the second data; and
after storing a threshold amount of the first data or the second data in the chained buffer,
providing, via the chained buffer, at least the threshold amount of the first data to the planar engine circuit, or
providing, via the chained buffer, at least the threshold amount of the second data to the at least one neural engine circuit.

19. An electronic device, comprising:
a neural processor circuit including:
- neural engine circuits at least one of which is configured to produce first data or of consume second data by performing at least convolution operations on a channel of data,
- a planar engine circuit configured to consume the first data received from the at least one neural engine circuit or produce the second data for the at least one neural engine circuit by performing at least operations on one or more channels of data, and
- a buffer memory coupled to the at least one neural engine circuit and the planar engine circuit, the buffer memory including a plurality of buffers, at least one of the buffers configured to control data flow between the at least one neural engine circuit and the planar engine circuit by operating as a chained buffer, wherein the chained buffer:
controls flow of the first data from the at least one neural engine circuit to the planar engine circuit, and
controls flow of the second data from the planar engine circuit to the at least one neural engine circuit.

20. The electronic device of claim 19, further comprising a system memory external to the neural processor circuit and coupled to the neural processor circuit, the system memory configured to:
- store input data a subset of which is sent to the buffer memory at a time for processing, and
- store one or more kernels sent to the at least one neural engine circuit for performing the at least convolution operations.

* * * * *

UNITED STATES PATENT AND TRADEMARK OFFICE
CERTIFICATE OF CORRECTION

| | |
|---|---|
| PATENT NO. | : 11,513,799 B2 |
| APPLICATION NO. | : 16/673499 |
| DATED | : November 29, 2022 |
| INVENTOR(S) | : Christopher L. Mills |

It is certified that error appears in the above-identified patent and that said Letters Patent is hereby corrected as shown below:

In the Claims

In Column 25, in Claim 19, Line 4, delete "or of" and insert -- or --, therefor.

Signed and Sealed this
Eighteenth Day of April, 2023

Katherine Kelly Vidal
*Director of the United States Patent and Trademark Office*